United States Patent [19]

Glance et al.

[11] Patent Number: 5,339,157
[45] Date of Patent: Aug. 16, 1994

[54] RAPIDLY TUNABLE INTEGRATED OPTICAL FILTER

[75] Inventors: Bernard Glance, Colts Neck; Robert W. Wilson, Holmdel, both of N.J.

[73] Assignee: AT&T Bell Laboratories, Murray Hill, N.J.

[21] Appl. No.: 19,961

[22] Filed: Feb. 19, 1993

[51] Int. Cl.$^5$ ............................................. G02B 6/28
[52] U.S. Cl. ...................................... 385/24; 385/37; 385/46
[58] Field of Search ................ 385/14, 24, 37, 46, 385/15

[56] References Cited

U.S. PATENT DOCUMENTS

| | | | |
|---|---|---|---|
| 4,342,499 | 8/1982 | Hicks, Jr. .................. | 385/39 |
| 4,592,043 | 5/1986 | Williams .................... | 385/18 |
| 4,773,063 | 9/1988 | Hunsperger et al. ........ | 385/130 |
| 5,002,350 | 3/1991 | Dragone ..................... | 359/124 |
| 5,136,671 | 8/1992 | Dragone ..................... | 385/46 |
| 5,179,605 | 1/1993 | Kaverhad et al. .......... | 385/37 |
| 5,233,453 | 8/1993 | Sivarajan et al. ........... | 385/130 |

*Primary Examiner*—Frank Gonzalez
*Attorney, Agent, or Firm*—Eugene S. Indyk

[57] ABSTRACT

A monolithically integrated optical filter which is rapidly tunable over a wide optical frequency range comprises an input frequency router connected to an output frequency router by means of controllably transmissive waveguides. A control circuit applies electrical energy to predetermined controllably transmissive waveguides to tune the optical filter to a desired one or more of a plurality of multiplexed input optical frequencies. This filter is economical to construct and is useful in high capacity, high speed optical communications networks.

7 Claims, 2 Drawing Sheets

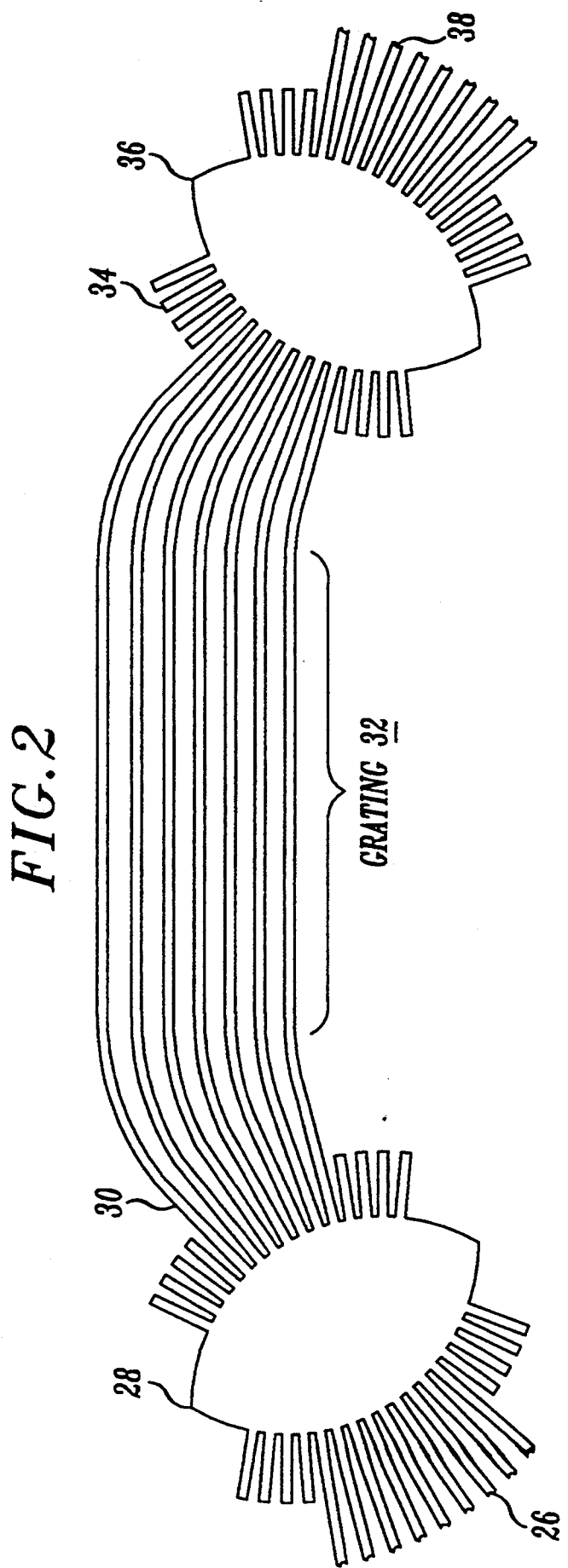

RAPIDLY TUNABLE INTEGRATED OPTICAL FILTER

CROSS-REFERENCE TO RELATED APPLICATIONS

This application is related to application Ser. No. 08/019,957 (still pending) of Bernard Glance and Robert Wilson, entitled "Rapidly Tunable Wideband Integrated Optical Filter," filed in the Patent and Trademark Office on the same day this application is being filed.

This application is related to application Ser. No. 08/019,952 (still pending) of Corrado Dragone and Ivan Kaminow, entitled "Rapidly Tunable Integrated Laser," filed in the Patent and Trademark Office on the same day this application is being filed.

This application is related to application Ser. No. 08/019,951 (still pending) of Bernard Glance and Robert Wilson, entitled "Rapidly Tunable Wideband Integrated Laser," filed in the Patent and Trademark Office on the same day this application is being filed.

TECHNICAL FIELD

This invention relates to optical communications systems. More particularly, this invention relates to integrated optical filters used in optical communications systems.

BACKGROUND

The capacity and speed of communications systems may be increased by transmitting information in optical form over networks composed of optically transmissive nodes, fibers, waveguides, and the like. High capacity optical communications systems require that many optical signals be frequency division multiplexed in the components of an optical network. Receivers must be configured such that a desired optical frequency may be retrieved from a group of many multiplexed optical frequencies. This necessitates the provision of suitable optical filters which separate desired optical frequencies from a frequency division multiplexed plurality of optical frequencies. Until now, there has been no convenient approach to filtering unwanted optical frequencies from desired optical frequencies. The performance of prior tunable optical filters, based on electro-michanical, electro-optic, acousto-optic, and magneto-optic effects, have been limited in terms of tuning speed, frequency selectivity, or tuning range. All of these prior devices also have been expensive to implement.

SUMMARY

In accordance with this invention, a rapidly tunable optical filter has been developed. The optical filter in accordance with this invention may be based upon photonic integrated circuitry which can provide a great deal of frequency selectivity and a wide tuning range which can be realized at a cost lower than that associated with implementing prior optical filters.

In one example of the invention, Applicants have surprisingly realized that integrated optical multiplexers and demultiplexers disclosed, for example, in U.S. Pat. No. 5,002,350 and U.S. Pat. No. 5,136,671 may be used to areate a monolithic fast optical filter having a wide tuning range. In specific terms, this example of the invention comprises two identical $1 \times N$ frequency routing devices with their frequency selective ports interconnected. Each path connecting the two devices contains an integrated optical amplifier acting as a gate. An input signal containing several different frequency channels is divided among output ports of the first frequency routing device and directed to respective inputs of the second frequency routing device. The second frequency routing device may output any selected frequency from the multiplexed combination of frequencies. Any of these channels may be selected by opening a respective gate by activating a respective optical amplifier between the first and second frequency routing devices. The other channels remain highly attenuated because of the inactivation of their respective optical amplifiers. Thus, only the selected channel exits the second frequency routing device. Broadband amplifier noise is filtered since only frequency noise components corresponding to the selected frequency path exit the second frequency routing device. The remaining amplifier noise is dissipated into the other N-1 unused outputs of the second frequency routing device.

This is only an example of the invention. The full scope of the invention entitled to an exclusionary right is set forth in the claims at the end of this application.

BRIEF DESCRIPTION OF THE DRAWINGS

FIG. 2 is a diagram illustrating the details of the frequency routing devices shown in FIG. 1.

DETAILED DESCRIPTION

Figure 1:
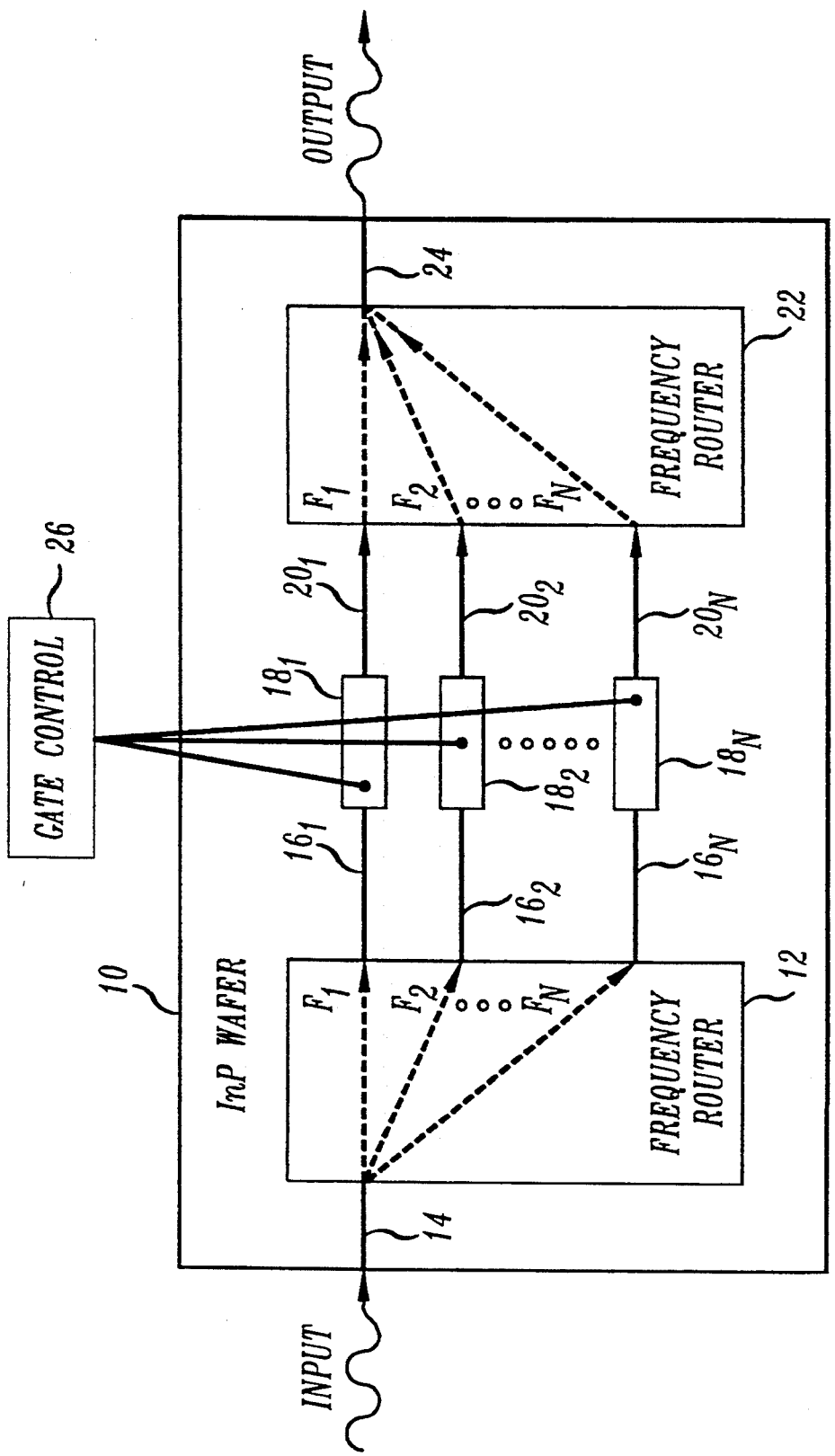
FIG. 1 is a diagram of an example of a tunable optical filter in accordance with this invention.

FIG. 1 shows an example of an optical filter which is rapidly tunable over a wide frequency range. It is composed of frequency routing devices, waveguides, and optically active sections. These structures may be monolithically integrated on a semiconductive wafer. They may be created by means of known photolithographic techniques.

FIG. 1 illustrates a wafer 10 made of a semiconductive material such as an indium phosphide based material such as InGaAsP. A first input frequency routing device 12 is defined on the wafer 10. The frequency routing device 12 may receive N multiplexed input optical frequencies $F_1, F_2, \ldots, F_N$ on a single input waveguide 14 defined on the wafer 10. The first frequency routing device 12 demultiplexes the input optical frequencies and directs each one of those frequencies into a separate output waveguide connected to the output of the frequency routing device 12. Specifically, frequency $F_1$ is directed to the output waveguide $16_1$, frequency $F_2$ is directed to the output waveguide $16_2$, and so on up to frequency $F_N$ which is directed to output waveguide $16_N$. Each of the output waveguides $16_1, 16_2, \ldots, 16_N$ is directed to the input of a doped section of waveguide with controllable optical transmissivity. The doping may be such that a suitable semiconductor Junction is created. These doped sections are optically active in that application of electrical energy to those sections will cause them to become transmissive to the flow of optical energy and will even provide some degree of gain to optical signals flowing through them. These doped sections of waveguide are substantially opaque to the transmission of light when there is no applied electrical stimulation. The specially doped sections thus may be considered to be gates or optical amplifiers depending upon whether or not they are excited with electrical energy. The details of creating such sections in a wafer such as the indium phosphide wafer 10 shown in FIG. 1 are generally known, are not a part of this invention, and thus are not described here.

Specifically in FIG. 1, an output waveguide $16_1$ is directed to the input of an optically active section $18_1$, an output waveguide $16_2$ is directed to the input of an optically active section $18_2$, and so on up to an output waveguide $16_N$ directed to the input of an optically active section $18_N$.

The outputs of the active sections $18_1, 18_2, \ldots, 18_N$ are connected to respective input waveguides $20_1, 20_2, \ldots, 20_N$ of an output frequency routing device 22. The frequency routing device 22 will multiplex single frequencies appearing on the N input waveguides onto a single output waveguide 24, if all of the active sections between the input router 12 and the output router 22 are activated with electrical energy. If only one of the active sections is stimulated with electrical energy, then only the frequency flowing in that activated section will appear on the output waveguide 24. The device shown in FIG. 1 thus acts as an optical filter for the multiplexed input frequencies appearing on waveguide 14 when appropriate active sections are stimulated. Accordingly, a digital gate control circuit 26 is provided for the structure of FIG. 1 which selectively applies electrical energy to predetermined ones of the sections between the frequency routers so that unwanted frequencies in the input stream to the device of FIG. 1 may be suppressed and one or more desired frequencies may be obtained from the output of the device of FIG. 1.

FIG. 2 shows the pertinent details of the routing devices 12 and 22 shown in FIG. 1. Both of those devices may have identical configurations. Each frequency routing device contains a plurality of input waveguides 26 connected to a free space region 28. A plurality of output waveguides 30 extends from the free space region 28 and is connected to an optical grating 32. The optical grating 32 comprises a plurality of unequal length waveguides which provides a predetermined amount of path length difference to a corresponding plurality of input waveguides 34 connected to another free space region 36. The free space region 36 is connected to a plurality of output waveguides 38. These frequency routing devices operate as multiplexers and demultiplexers of optical frequencies. The details of their construction and operation are more fully described in the U.S. patents referred to above, the entire contents of which are hereby incorporated by reference into this application. In the case of the frequency routing device 12, one of the input waveguides 26 is used as the input waveguide 14 of the device shown in FIG. 1 and the plurality of output waveguides 38 are used as the output waveguides $16_1, 16_2, \ldots, 16_N$. In the case of the frequency routing device 22, the plurality of input waveguides 26 are the input waveguides $20_1, 20_2, \ldots, 20_N$ shown in FIG. 1 and one of the output waveguides 38 is the output waveguide 24 shown in FIG. 1.

The device of FIG. 1 may be tuned to a large number of different optical frequencies used in high speed, high capacity optical communications networks. For example, frequency routing devices with N up to 32 or more may be conveniently fabricated on a single semiconductive wafer. This results in an optical filter which can be tuned to any of up to 32 or more optical frequencies. The doped sections between the frequency router in FIG. 1 may be switched on or off at up to nanosecond speeds thereby resulting in rapid tuning of the FIG. 1 filter to the desired frequencies. Devices such as the filter in FIG. 1 are attractive for large size optical network applications based on frequency division multiplexing.

We claim:

1. A tunable integrated optical filter, comprising:
   an input frequency routing device for receiving a plurality of multiplexed optical frequencies; and
   an output frequency routing device responsive to the input frequency routing device for producing an optical output representing a selected one or more of the multiplexed optical frequencies.

2. The optical filter of claim 1, further comprising:
   a plurality of waveguides connecting a plurality of outputs from the input frequency routing device to a plurality of inputs of the output frequency routing device;
   each of the plurality of waveguides comprising a controllably transmissive section.

3. The optical filter of claim 2, further comprising:
   a control circuit for selectively applying electrical energy to a predetermined one or more of the controllably transmissive sections for tuning the optical filter to a predetermined one or more of the plurality of multiplexed optical frequencies received by the input frequency routing device.

4. The optical filter of claim 1, in which the input frequency routing device comprises:
   at least one input waveguide;
   a first free space region connected to the at least one input waveguide;
   a plurality of output waveguides connected to the first free space region;
   an optical grating connected to the plurality of output waveguides comprising a plurality of unequal length waveguides;
   a plurality of input waveguides connected to the optical grating;
   a second free space region connected to the plurality of input waveguides connected to the optical grating; and
   a plurality of output waveguides connected to the second free space region.

5. The optical filter of claim 1, in which the output frequency routing device comprises:
   a plurality of input waveguides;
   a first free space region connected to the plurality of input waveguides;
   a plurality of output waveguides connected to the first free space region;
   an optical grating connected to the plurality of output waveguides comprising a plurality of unequal length waveguides;
   a plurality of input waveguides connected to the optical grating;
   a second free space region connected to the plurality of input waveguides connected to the optical grating; and
   at least one output waveguide connected to the second free space region.

6. The optical filter of claim 4, in which the output frequency routing device comprises:
   a plurality of input waveguides;
   a first free space region connected to the plurality of input waveguides;
   a plurality of output waveguides connected to the first free space region;
   an optical grating connected to the plurality of output waveguides comprising a plurality of unequal length waveguides;

a plurality of input waveguides connected to the optical grating;

a second free space region connected to the plurality of input waveguides connected to the optical grating; and at least one output waveguide connected to the second free space region.

7. The optical filter of claim 6, in which each of the plurality of output waveguides of the input frequency routing device are connected to a respective one of the plurality of input waveguides of the output frequency routing device by means of one of the controllably transmissive sections.

* * * * *